US010198292B2

United States Patent
Prakash et al.

(10) Patent No.: US 10,198,292 B2
(45) Date of Patent: Feb. 5, 2019

(54) SCHEDULING DATABASE QUERIES BASED ON ELAPSED TIME OF QUERIES

(71) Applicant: Actian Corporation, Palo Alto, CA (US)

(72) Inventors: Ravindra Prakash, San Jose, CA (US); David Benedict Galimberti, Ann Arbor, MI (US); Richard Dennis Glick, Valley Center, CA (US)

(73) Assignee: Actian Sub III, Inc., Palo Alto, CA (US)

( * ) Notice: Subject to any disclaimer, the term of this patent is extended or adjusted under 35 U.S.C. 154(b) by 737 days.

(21) Appl. No.: 14/463,992

(22) Filed: Aug. 20, 2014

(65) Prior Publication Data
US 2015/0149501 A1 May 28, 2015

Related U.S. Application Data

(60) Provisional application No. 61/909,857, filed on Nov. 27, 2013.

(51) Int. Cl.
*G06F 17/30* (2006.01)
*G06F 9/50* (2006.01)
(52) U.S. Cl.
CPC ...... *G06F 9/5027* (2013.01); *G06F 2209/506* (2013.01)
(58) Field of Classification Search
CPC .................................................. G06F 9/5027
See application file for complete search history.

(56) References Cited

U.S. PATENT DOCUMENTS

| 7,093,250 | B1 * | 8/2006 | Rector | G06F 9/4881 707/999.001 |
| 2006/0136354 | A1 * | 6/2006 | Bell | G06F 17/30592 |
| 2011/0246481 | A1 * | 10/2011 | Narayanan | G06F 17/30442 707/748 |
| 2014/0101100 | A1 * | 4/2014 | Hu | H04L 67/1002 707/617 |

* cited by examiner

*Primary Examiner* — Etienne P Leroux
*Assistant Examiner* — Dara J Glasser
(74) *Attorney, Agent, or Firm* — Fenwick & West LLP

(57) ABSTRACT

A system, for example, an online system or a database system schedules requests received for execution. The system maintains consumer groups and receives a measure of amount of resources allocated for each consumer group. The system maintains a measure of accumulated elapsed time of execution of requests received from each consumer group. If the system determines that resources are available for executing a request, the system selects a request for execution from a consumer group based on the measure of accumulated elapsed time for processing queries for the consumer group and the measure of amount of resources allocated for the consumer group. The system maintains relative cumulative elapsed times of queries across consumer groups in the same ratio as the allocated share for the consumer groups. Accordingly, the system schedules requests such that each consumer group approaches its allocation of resources compared to other groups smoothly over time.

20 Claims, 4 Drawing Sheets

SCHEDULING DATABASE QUERIES BASED ON ELAPSED TIME OF QUERIES

CROSS REFERENCE TO RELATED APPLICATION

This application claims the benefit of U.S. Provisional Application No. 61/909,857 filed on Nov. 27, 2013, which is incorporated by reference in its entirety.

BACKGROUND

This invention relates to scheduling of requests executed by an online system in general and in particular to scheduling of execution of queries in a database system.

Online systems receive requests from users and process them. For example, an online system that provides content, receives requests for content from users or from other applications. Similarly, a database system receives database queries for processing from sources, for example, users, applications, and so on. A source of queries is referred to as a consumer, since the source of requests consumes resources of the online system. Consumers may be associated with priorities. For example, certain users may have higher priority compared to other users, certain applications may have higher priority compared to other applications and so on. Consumers with higher priority typically get larger share of resources of the online system compared to consumers with lower priorities.

When the online system receives a request for processing, the online system does not have an accurate measure of the time required for processing the request. Therefore, while providing resources for executing a number of requests received from different consumers, the online system may allocate disproportionate amount of resources. Conventional techniques for scheduling requests often allocate disproportionate amount of resources to consumers thereby providing more resources to some consumers than they deserve and less resources to other consumers.

SUMMARY

Embodiments of the invention schedule queries for execution in a database system. The database system maintains consumer groups, each consumer group associated with one or more sources of database queries. The database system receives a measure of amount of resources allocated for each consumer group. The database system maintains a measure of accumulated elapsed time of execution of database queries received from each consumer group. The database system determines whether resources are available for processing a database query. If the database system determines that resources are available for executing the database query, the database system selects a database query for execution from a consumer group based on the measure of accumulated elapsed time for processing queries for the consumer group and the measure of amount of resources allocated for the consumer group.

In an embodiment, the database system selects the database query based on a comparison of the measure of accumulated elapsed time for processing queries for the consumer group and the measure of amount of resources allocated for the consumer group. In another embodiment, the database system selects the database query based on a ratio of the measure of accumulated elapsed time for processing queries for the consumer group and the measure of amount of resources allocated for the consumer group.

In an embodiment, the database system reduces the rate at which queries from that particular consumer group are processed if the measure of accumulated elapsed time for processing queries exceeds the measure of amount of resources allocated for a particular consumer group. In another embodiment, the database system increases the rate at which queries from that particular consumer group are processed if the measure of accumulated elapsed time for processing queries is below the measure of amount of resources allocated for a particular consumer group.

The features and advantages described in this summary and the following detailed description are not all-inclusive. Many additional features and advantages will be apparent to one of ordinary skill in the art in view of the drawings, specification, and claims.

Figure 1A:
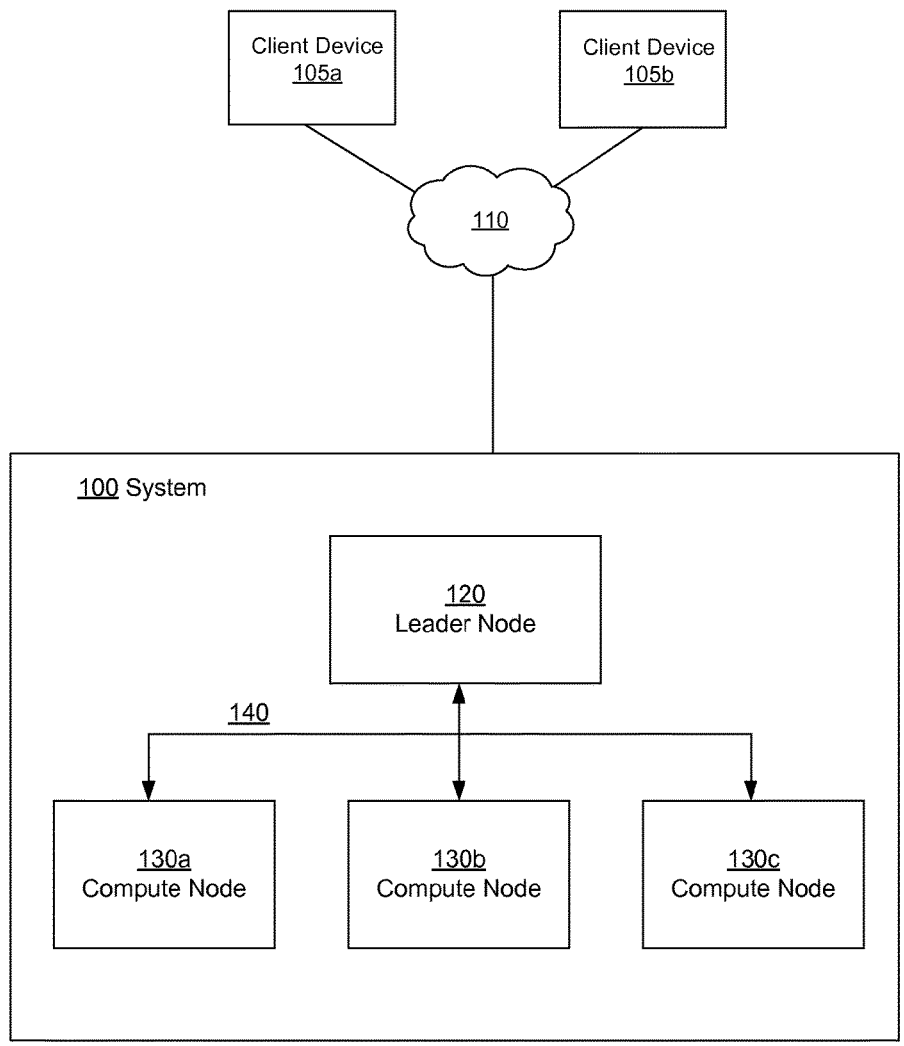
FIG. 1A shows the architecture of a parallel database system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments use accumulated query processing time for determining allocation of resources for consumers in a system, for example, a database system or an online system. Although various embodiments describe the scheduling strategy for processing database queries, the scheduling strategy described herein can be used for processing other kinds of requests by other types of systems. For example, the embodiments can be used for work load management for an online system that processes requests from users, each request consuming resources of the online system.

The system measures query processing time in terms of elapsed time when the query is processed. Accordingly, the system determines cumulative elapsed time for processing queries received from each consumer during a time interval. The system uses the cumulative elapsed time for a consumer as a measure of resource usage consumption by the consumer. If the cumulative elapsed time for a consumer exceeds a threshold, the system reduces the resources allocated for the consumer. On the other hand, if the cumulative elapsed time for a consumer is below a threshold, the system increases the resources allocated for the consumer. The system may maintain the threshold value as a constant value for an active consumer group or may determine the threshold value or adjust the threshold value on an ongoing basis.

In an embodiment, the system allocates a share of available resources for each active consumer. The system attempts to maintain the relative cumulative elapsed times of queries across consumers in the same ratio as the allocated share for the consumers. In other words, the threshold for the cumulative elapsed time is determined based on the allocated share of the consumer. For example, an important consumer may be allocated a larger share of resources than other consumers. The threshold corresponding to the cumulative elapsed time for the consumer is determined to be larger than the threshold for other consumers. Accordingly, the system maintains a larger cumulative elapsed time of queries for this consumer compared to other consumers. However, if over a time interval, the cumulative elapsed time of this consumer exceeds the larger threshold value, the rate at which queries from this consumer are processed is reduced. As a result, over time, the cumulative elapsed time for the consumer slowly reduces to reach a value below the threshold.

The system uses historical information about queries executed in the past for each consumer group to determine how queries are scheduled. Elapsed time of all queries from a consumer group is accumulated. For example, the system may determine elapsed time for queries from each consumer within a given time interval or for the entire time since the system was most recently started. Each consumer group may have queries in queues waiting for execution.

The system maintains consumer groups associated with groups of queries classified based on certain criteria, for example, a source of the query, a type of the query, a user defined keyword, etc. or a combination of one or more criteria specified using expressions, e.g., boolean expressions. A consumer group may be associated with a group of consumers, i.e., sources of queries. Each active consumer group is allocated a share of the available resources. An active consumer group is a consumer group that is actively sending queries. For example, a consumer group that has not sent queries for more than a predetermined threshold amount of time may be considered inactive.

In an embodiment, the system determines a measure of the resources allocated to each consumer group. The measure of resources allocated to a consumer group is determined as a ratio of the share resources allocated to the consumer group with the total available resources of the system. Assume that the total available resources are R and a consumer group G is allocated Rg resources. The measure of resources allocated to the consumer G group is determined to be Rg/R. For example, a consumer group may be allocated 50% or ½ of all available resources, whereas another consumer group may be allocated 20% or $\frac{1}{5}^{th}$ of all resources available. In some embodiments, the ratio Rg/R represents a target ratio of cumulative elapsed query time (i.e., Tg/T) to be achieved by the system for each consumer group.

Overall System Environment

FIG. 1A shows the overall system environment for scheduling queries using an example architecture of a parallel database system, in accordance with an embodiment of the invention. The system 100 includes a leader node 120, one or more compute nodes 130, and a parallel communication fabric 140 (not shown in FIG. 1). (A letter after a reference numeral, such as "130a," indicates that the text refers specifically to the element having that particular reference numeral, while a reference numeral in the text without a following letter, such as "130," refers to any or all of the elements in the figures bearing that reference numeral.)

Although embodiments, examples, and figures described herein describe processing of database queries processed by a database system, the concepts described herein can be applied to any online system that processes requests or tasks provided by a set of consumers or requestors. For example, the embodiments described herein can be applied to a website processing requests from users where the users are classified as consumer groups.

In an embodiment, queries processed by the system are specified using the structured query language (SQL), for example, a SELECT, UPDATE, INSERT, COPY, or another SQL statement. The leader node 120 controls the execution of the compute nodes 130. The nodes 120, 130 communicate with each other via the parallel communication fabric 140. The leader node 120 and the compute nodes 130 can comprise any type of processor, for example, standard x86 servers running Linux or multi-core systems. Users and applications may communicate with the system via the leader node by using standard interfaces, ANSI SQL via ODBC/JDBC.

The leader node 120 may be connected to the network 110 and may interface with external applications and other computers using the network. A leader node manages communications with the compute nodes. In an embodiment, the leader node controls sessions, parsing and optimizing queries, and scheduling execution of the workload. The leader node may or may not participate in data operations. The leader node may be optimized for outward communication and handling of query overhead so the resources of the compute nodes are utilized for performing data operations.

Compute nodes 130 are the components of the system 100 that perform processing and storing of data. Each compute node 130 stores and manages a subset of rows of each table. For example, if a table has 1 billion rows and there are 20 compute nodes, then approximately 50 million rows are distributed to each compute node 130. Data may be distributed to a particular compute node 130 based on a particular data distribution strategy, for example, based on a hashing algorithm applied to a distribution key, or by round robin.

The communication fabric 140 is configured to efficiently handle movements of large intermediate result sets, data redistribution, low rate of packet loss and so on. In some embodiments, communication fabric 140 uses multiple links simultaneously running multiple data streams. The communication fabric 140 may be implemented internally as multiple independent networks all communicating data for the system 100.

Client devices 105 are computing devices that execute client software, e.g., a web browser or built-in client application, to interact with the system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that interacts with a database system.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the system 100 are typically performed via a network 110, for example, via the internet. The network 110 enables communications between the client device 105 and the system 100. In one embodiment, the network 110 uses standard communications technologies and/or protocols. In another embodiment, the entities can use custom and/or dedicated data communications technologies instead of, or in addition to, the ones described above.

Workload Management

The system 100 allows consumer groups to be defined for classifying users or requestors of the system. Consumer groups allow allocation of query resources among competing users and applications. Applications or query workloads are classified as belonging to a consumer group. The system schedules the queries in such a way that over time the accumulated elapsed time for consumer groups is maintained in the same proportion as the value of ratio of allocated resources for each consumer group. For example consumer groups "marketing", "production applications", "management" may be weighted as 3, 4, 2 and thereby are allocated 3/(3+4+2) i.e., 3/9, and 4/9, 2/9 of the resources. The system schedules the queries such that over time each group gets its allocated share of resources.

If one or more consumer groups are absent or not active in the system (e.g. no user/application from that consumer group is connected to the database or is submitting queries) the database system is proportionately allocated to the "active" consumer groups. For example, groups A, B, C, and D have been allocated relative resources quota of 20, 30, 40, and 10. If only groups A and D are "active", they would share the available resource in the ratio of 20, 10. Elapsed time is used to measure usage of resources since elapsed time calculations are easy to make and give us a reasonable way to divide the resources among competing workloads from different classes of users, for example, marketing, management, analysts, development, administration etc. The system schedules queries in such a way that consumer groups' consumption limits are honored over time and avoid peaks and valleys in resource usages. In an embodiment, each consumer group maintains a queue of waiting queries in the job priority, first in first out order.

The system determines a measure of current resource usage for each consumer group based on a ratio of cumulative elapsed time for processing queries over a time interval for the consumer group and the cumulative elapsed time for all consumer groups. The time interval can be a previous time interval based on a moving window or the entire time interval since the system was last started. For example, assume that the total cumulative time for queries processed by the system during the time interval for all active consumer groups is T. Also assume that the cumulative elapsed time for all queries received from a particular consumer group G is Tg. The measure of resource usage of the consumer group G is determined to be Tg/T, i.e., the fraction of elapsed time of queries attributed to consumer group G for a given time interval.

The system attempts to maintain the value of Tg/T to be same or substantially same as Rg/R. Accordingly, if Tg/T becomes larger than Rg/R, the system reduces the rate at which queries from consumer group G are processed. As a result over time, the value of Tg/T decreased over time until it is close to Rg/R. Similarly, if Tg/T becomes smaller than Rg/R, the system may increase the rate at which queries from consumer group G are processed. As a result, the value of Tg/T increases over time until it becomes close to Rg/R.

In an embodiment, a system defines service classes for specifying runtime characteristics of different types of queries. A service class captures run-time execution parameters of a query such as query working memory, eviction policy and minimum concurrent queries. A service class defines a query's execution environment whereas a consumer group determines how queries are queued and scheduled for execution.

The system allows users to specify classification rules for determining the consumer group or service class of a query. The classification rule is specified as a boolean expression ("condition") and a set of "actions" to be executed when the "condition" evaluates to true. A condition is a boolean expression based on attributes of connection, query, or user settable variables. Examples of connection attributes are database user name or database name. Examples of attributes of a query are query type, statement type, application name describing the requestor, and user settable variables (could be any user defined variable). Actions are used to route a query to a consumer group, assign a service class to the query, reject the query, or set the job priority for the query. Actions are part of the classification specification.

A collection of classification rules that classify a query into a service class are known as service class classifications. More than one action can be present in the action part of the classification. The work load manager performs one action at a time for a classification. A consumer group classification is specified by structures or definition similar to the service class classifications except that an action can set the job priority of the query or assign a consumer group.

The system maintains settings, for example, maximum concurrent queries value that specifies maximum number of queries that can run concurrently at any time. The maximum concurrent queries may be a system level parameter of a service class level parameter applicable to an execution slot. A user may specify service class parameters, for example, minimum concurrent queries, a parameter that specifies the number of query slots reserved for a service class. If there are not enough queries to fill query slots for a service class, the unused slots are reserved for future query submissions to this service class and maximum concurrent queries capacity is not reached by the number of empty query slots in this service class.

Figure 1B:
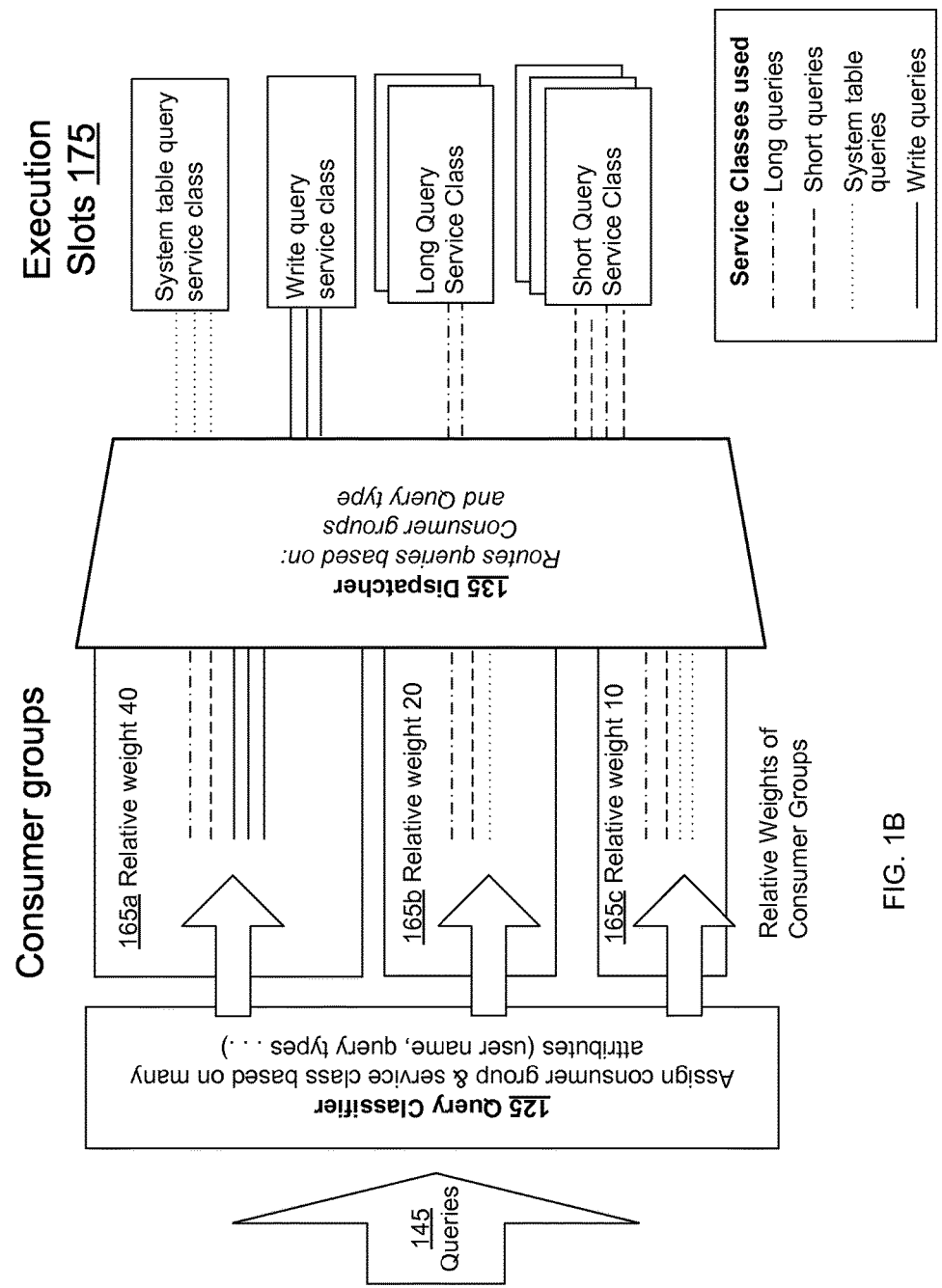
FIG. 1B shows the overall system environment illustrating how queries are scheduled for execution, in accordance with an embodiment of the invention.

FIG. 1B shows the overall system environment illustrating how queries are scheduled for execution, in accordance with an embodiment of the invention. The system 100 receives queries 145 for processing. Each query may include information describing the user or consumer that sent the query. The system 100 includes a query classifier 125 that classifies the incoming queries based on the type of user that requested the query and the type of query. In an embodiment, an incoming query is first classified into a consumer group using the consumer group classifications specified in the work load manager configuration. The query is then re-classified into a service class by finding a match in the service class classifications.

The system applies the consumer group classification rules to the query to select a consumer group for the query and assign the job priority to the query. A consumer group is associated with a relative weight 155. The relative weight is proportionate to the amount of resources allocated to the consumer group. FIG. 1B illustrates the relative weights 165 for each consumer group by rectangles of sizes in proportion to the relative weights.

The system includes a dispatcher 135 that routes incoming queries for execution. The system applies the service class classifications rules to the query. This results in selection of a service class for the query. The system assigns execution slots 175. An execution slot 175 (or a query slot) can be considered as reserved resources for execution of queries of a particular service class. The amount of resources reserved may depend on the type of queries. For example, larger amount of resources may be reserved for complex queries compared to simple queries.

FIG. 1B shows different execution slots for different service classes including, system table query service class, write query service class, long query service class, and short query service class. A system may assume that there is only one service class. If all available resources for an execution slot are in use, queries of that service class are put in a queue. The system places the query in its consumer group's job queue. The queuing order is governed by job-priority and query start time. The queue can be accessed across all service classes or only for a given service class.

As resources for an execution slot are made available, queries from the service class are picked up for execution. The system picks the next query for execution from all waiting queries. If the system has not filled all execution slots for a service class, the system de-queues the query and submits the query for execution. The query remains in the queue and waits for its turn. When a query finishes its execution for any reason such as completion of the query, cancel by a user, or eviction by the system because it ran out of its threshold, the system selects the next query for processing.

System Architecture

Figure 2:
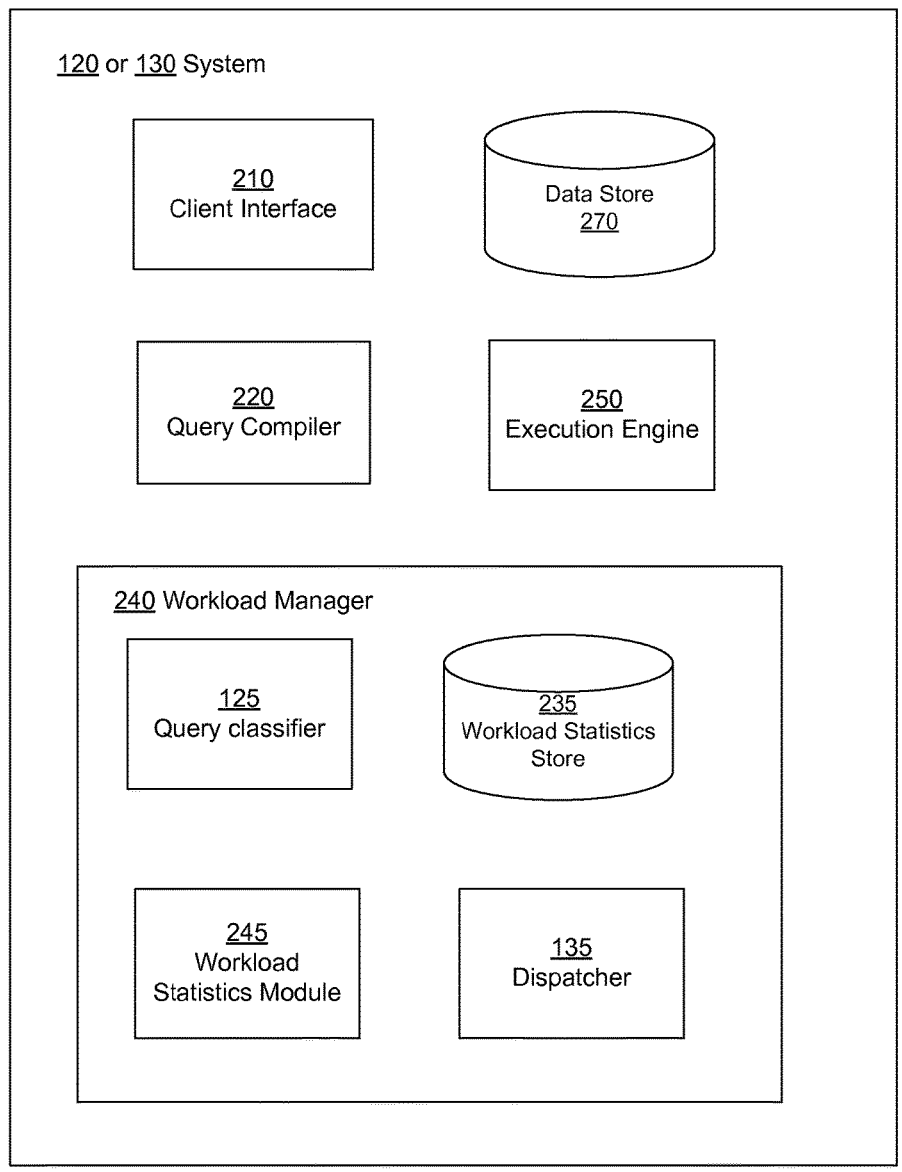
FIG. 2 shows a high level view of the system architecture and the internal components of the database system, in accordance with an embodiment.

FIG. 2 is a high level block diagram illustrating the system architecture of a node 120, 130 of the system 100, for example the leader node 120 or the compute node 130, in accordance with an embodiment. The compute nodes implement a set of processes that manage communication with the leader node to receive commands, send back data, and route compiled code to individual query processes (for each core or slice on the compute node) to execute for a given query.

The node 120 or 130 comprises a client interface 210, a query compiler 220, an execution engine 250, a data store 270, and a workload manager 240. In alternative configurations, different and/or additional modules may be included in the system. The client interface 210 allows a node to interact with client devices 105. When a new client request comes in to perform a query or some other type of database operation, the node 120 spawns a new process to maintain session information for that client. That process is maintained as long as the client session remains open and that client is sending query requests to the leader node 120.

The data store 270 stores the data on a persistent storage, for example, a disk. This data includes relations or tables comprising rows and columns of user data. The data store 270 may also store metadata, for example, various configuration parameters including classification rules for classifying queries into consumer groups or service classes. The query compiler 220 compiles each query to generate a plan for execution of the query and performs any optimizations needed. The execution engine 250 executes the database queries.

The workload manager 240 manages workloads for the system 100. The workload manager 240 schedules queries for execution. The workload manager 240 further comprises modules including the query classifier 125, the dispatcher 135, a workload statistics store 235, and a workload statistics module 245. The workload statistics module 245 stores statistics describing the state of the system 100 in the workload statistics store 235 for determining how to manage workload of the system. For example, the workload statistics module 245 measures cumulative elapsed times of execution of queries corresponding to each consumer group.

The workload manager schedules the queries from the queues in a manner that maintains a cumulative elapsed time of queries from a consumer group with respect to all the consumer groups in the same ratio as the share allocated to the consumer group with respect to all the consumer groups. For example, if a particular consumer group is allocated 40% share of all resources available for the system, the workload manager attempts to maintain the cumulative elapsed time of queries from the consumer group with respect to the cumulative elapsed time for all the consumer groups over the same time interval in the same ratio, i.e., 40%.

The following example illustrates how consumer group classification may be specified. The workload manager 240 uses the classification information to determine which consumer group a query belong to.

```
<resource_share_group_classifications>
    <classification>
        <condition>
            condition string
            [<query_type>system|read|write</query_type>] (BC)>
        </condition>
        <action>
            <assign resource_share_group="AA"/>
        </action>
    </classficiation>
    ...
</resource_share_group_classifications>
```

A condition string can have a format "<variable name><binary operator><value>". A condition string can use logical operators, for example, "<condition>[logical operator] "<condition>." A variable name can be a database user name, client user name, application name, client IP address, authentication type (LDAP, Kerberos etc.), statement type of the database query (SELECT, UPDATE, INSERT, etc.), query group, query type, or a user defined keyword. A <value> may be a string formed by using a single quote or double quote characters. Examples of binary operators are: <, >, <=, >=, !=, IN, LIKE. Logical operators can be AND, OR, NOT. Parentheses '('and')' may be allowed to support logical grouping. Values can be a comma separated list (for IN operator) or individual values. Accordingly, a consumer group may be defined based on a particular database username, or all users that user a particular client IP address, or all users that user a particular authentication type. Users can specify a consumer group based on a user defined keyword. All queries received that include the user defined keyword are classified as queries belonging to a particular consumer group.

Scheduling Queries

The workload manager maintains the cumulative elapsed time of queries from the consumer group with respect to all the consumer groups in the same ratio as the share allocated to the consumer group with respect to all the consumer groups by controlling the rate of processing queries for each consumer group. For example, if over the previous time interval, the ratio of the accumulated elapsed time for a consumer group with respect to the total accumulated elapsed time for all active consumer groups for a time interval is greater than the ratio of the allocated share of the consumer group with respect to the overall available resources, the workload manager reduces the rate of processing of queries from that consumer group. Alternatively, if over the previous time interval, the ratio of the accumulated elapsed time for a consumer group with respect to the total accumulated elapsed time for all active consumer groups for a time interval is less than the ratio of the allocated share of the consumer group with respect to the overall available resources, the workload manager increases the rate of processing of queries from that consumer group.

In an embodiment, each consumer group is associated with a value that indicates the relative measure of a target cumulative elapsed time for executing queries from the consumer group. The values of relative measures are relative with respect to the other consumer groups. For example, if consumer group g1 has relative measure value as 50 and consumer group g2 has relative measure value 30, the workload manager adjusts the number of queries processed for each of the consumer groups such that the relative cumulative elapsed time for consumer groups g1 and g2 stays in the ratio of 50/30=5/3. For example, if the cumulative elapsed time for consumer group g1 becomes 5000 units and the cumulative elapsed time for consumer group g2 becomes 1000 units, the relative cumulative elapsed time of g1 with respect to g2 has increased to 5000/1000=5/1 instead of 5/3. Accordingly, the workload manager reduces the number of queries processed for group g1 and increases the queries processed for group g2 so as to bring the value of ratio of cumulative elapsed times of g1 and g2 closer to 5/3.

Figure 3:
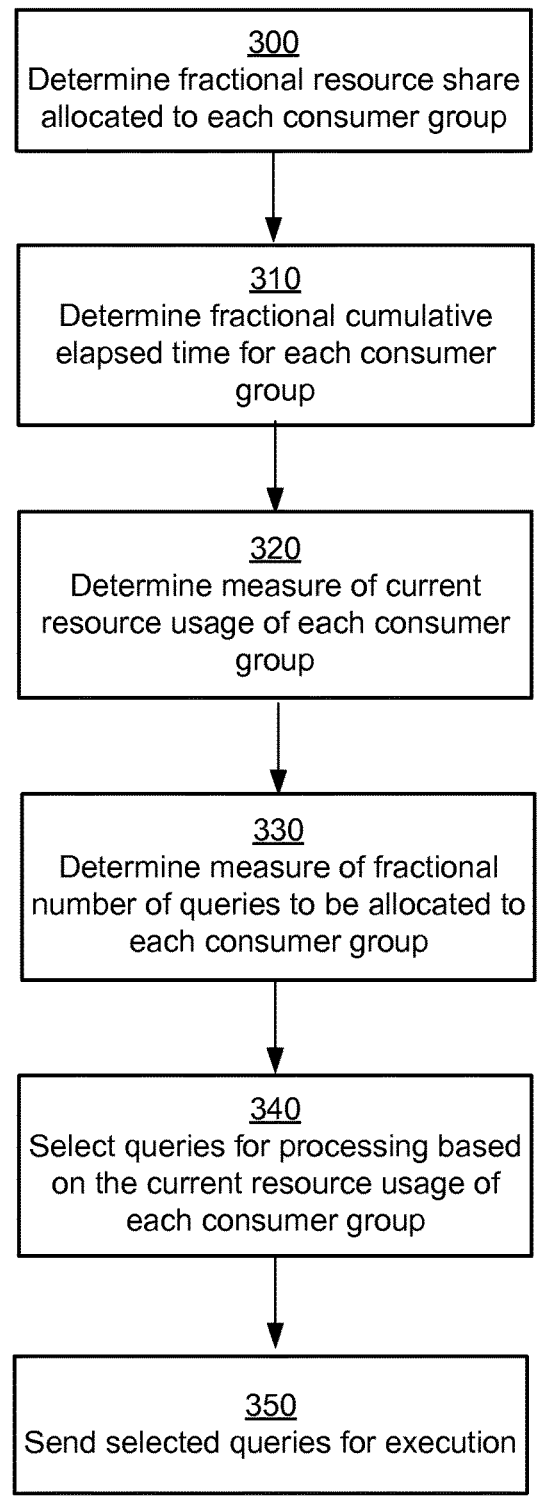
FIG. 3 shows a flowchart illustrating the scheduling of requests in the system, in accordance with an embodiment.

FIG. 3 shows a flowchart illustrating the scheduling of requests in the system, in accordance with an embodiment. The workload statistics module 245 determines 300 a measure of fractional resource share allocated to each consumer group. In an embodiment, the workload statistics module 245 receives $S_g$ a measure of share of consumer group g. The workload statistics module 245 receives or determines the fractional resource share for an active group g, i.e., $FS_g$ as the ratio of the resource share for group g and the total resource shares of all active groups. This is described by the following equation.

$$FS_g = \frac{S_g}{\sum_{g' \in G} S_{g'}}$$

Assume that there are four consumer groups: marketing, production, development, and executives. Assume that the relative resource share for each group is as follows: marketing: 50, production: 30, development: 10, and executives: 10. The values assigned as allocation share for each consumer group can be either a percentage of total available resources or it can be arbitrary numbers that reflect relative share. For example, the total of relative resource share of all available consumer groups does not have to add up to a 100. The total resources available can be determined by adding the resource share of a set of consumer groups. Assume that only marketing consumer group and production consumer are active and have queries in their consumer group queues. Accordingly, $FS_{marketing}$ can be determined to be (50/(50+30))=5/8 and $FS_{production}$ can be determined to be (30/(50+30))=3/8. The denominator for the above expressions, i.e., (50+30) is obtained by adding all the share of all active consumer groups, i.e., marketing (share=50) and production (share=30).

Note that the value of $FS_g$ for a consumer group g can change depending on the number of active consumer groups. For example, if a new consumer group becomes active, the value of $FS_g$ for a consumer group g may decrease. Similarly if an active consumer is determined to have become inactive, the values $FS_g$ of remaining consumer groups may increase.

The workload statistics module 245 determines 310 a fractional cumulative elapsed time for each consumer group, $FT_g$. The $FT_g$ is used as statistics describing resource usage of various consumer groups to determine how to schedule queries received by the system. The workload statistics module 245 maintains total elapsed time of execution of queries received from all active consumer groups for a given time window. The total elapsed time of queries executed by all consumer groups is referred to as $T_{ALL}$. The time window may be the time since the last reset of the statistics. The statistics stored in the workload statistics store 235 may be reset manually by a system administrator or automatically by the workload manager 240, for example, periodically. The time window may be a moving time window that is continuously or periodically advanced as time proceeds.

The workload statistics module 245 maintains the total elapsed time of queries executed by each active consumer group during the same time window. Assume that the set of all active consumer groups is G and g represents a particular consumer group. For example, for group g, the cumulative elapsed time of queries received from consumer group g is $T_g$. For the given window, the total cumulative elapsed time of all consumer groups $T_{ALL}$ may be determined as the sum of total time for all individual consumer groups $T_g$. The summation is performed over all consumer groups g, belonging to set G, i.e., g∈G.

$$T_{ALL} = \sum_{g \in G} T_g$$

The workload statistics module 245 determines a $FT_g$, a measure of fractional cumulative elapsed time for each consumer group g. The fractional cumulative elapsed time for each consumer group g is the ratio of the cumulative elapsed time of queries received from consumer group g is $T_g$ and consumer group total cumulative elapsed time of all consumer groups $T_{ALL}$.

$$FT_g = \frac{T_g}{T_{ALL}}$$

The sum of all fractional cumulative elapsed time $FT_g$ for all active consumer groups g, i.e., g∈G is 1.0. In other words, the following equation is true.

$$\sum_{g \in G} FT_g = 1.0$$

The workload statistics module 245 further determines 320 a measure of current resource usage of each consumer group. Let $R_g$ be a measure of current resource usage of each consumer group. The measure of current resource usage of each consumer group is determined as the ratio of the fractional cumulative elapsed time for each consumer group $FT_g$ and the fractional resource share allocated to each consumer group $FS_g$. The calculation of current resource usage of each consumer group, $R_g$ is determined using the following equation.

$$R_g = \frac{FT_g}{FS_g}$$

Note that the value of for $FS_g$ for each consumer group is assumed to be a value greater than 0. If $R_g<1.0$ then the workload manager determines that queries in group g have not used the allocated share of the resources. If $R_g$ is close to 1.0 then the workload manager determines that the queries in group g have been using allocated share of the box. If $R_g>1.0$ then the workload manager determines that group g has used more time than its fair share of allocation.

The workload statistics module 245 determines 330 a measure of fractional number of queries to be allocated for each consumer group, $Q_g$. In an embodiment, the workload statistics module 245 uses the following equation to determine the value of $Q_g$ for group g.

$$Q_g = (1.0 + \alpha(1-R_g)) \times FS_g$$

The value $\alpha$ is a speed up factor that is a predetermined (and configurable parameter) value that by default may be 1.0 but can be set to a value either greater than or less than 1.0. The value $\alpha$ determines how fast a consumer group that is consuming more resources than allocated to it converges to a state where its consumption of resources is according to its allocated quota. The consumption of resources as described herein is based on the cumulative elapsed time for executing queries for the consumer group. The above equation determines $Q_g$ based on the current resource usage of the consumer group g and the fractional resource share $FS_g$ for the consumer group g. An important property of $Q_g$ is that the sum of $Q_g$ over all consumer groups is 1.0. This property implies that the available resources in the system can be fully utilized. This is described in the following equation.

$$\sum_{g \in G} Q_g = 1.0$$

If consumer group g is using the right amount of allocated as per the allocation of the consumer group, the value of $R_g$ is close to 1.0. In this case, the value of $Q_g$ is same as $FS_g$ and the dispatcher maintains the rate at which queries are being sent for execution for the query group as unchanged. If consumer group g is using more than the allocated share, the value of $R_g$ is greater than 1.0 because the fractional cumulative elapsed time measure $FT_g$ is greater than the fractional share $FS_g$ allocated to consumer group g. In this case, the value of $Q_g$ is less than $FS_g$ and the dispatcher reduces the rate at which queries are being sent for execution for the query group g. If consumer group g is using less than the allocated share, the value of $R_g$ is less than 1.0 because the fractional cumulative elapsed time measure $FT_g$ is less than the fractional share $FS_g$ allocated to consumer group g. In this case, the value of $Q_g$ is greater than $FS_g$ and the dispatcher increases the rate at which queries are being sent for execution for the query group g.

Computing the ratio of $FT_g$ and $FS_g$ is one way of determining the value of $Q_g$. Other embodiments compare the values of $FT_g$ and $FS_g$. If the value of $FT_g$ is determined to be equal to or substantially equal to $FS_g$, the dispatcher maintains the current rate at which queries from consumer group g are processed. If the value of $FT_g$ is determined to be greater than $FS_g$, the dispatcher reduces the rate at which queries from consumer group g are processed. If the value of $FT_g$ is determined to be less than $FS_g$, the dispatcher increases the rate at which queries from consumer group g are processed. The amount by which the dispatcher reduces or increases the rate at which queries from consumer group g are processed may be determined based on either the difference between the values of $FT_g$ and $FS_g$ or the ratio of the values of $FT_g$ and $FS_g$.

The dispatcher 135 selects 340 queries for processing based on the current resource usage of each consumer group. Assume that the system parameters have been specified so that the maximum concurrency for queries is specified as M. The dispatcher 135 determines a target number of concurrent queries to be allocated to group g as the product of $Q_g$, the fractional query allocation for group g and the maximum concurrency for queries M. In other words, the target number of concurrent queries to be allocated to group g, i.e., $TN_g$ is determined using the following question.

$$TN_g = (Q_g \times M)$$

The dispatcher 135 determines the number of queries to be submitted for a consumer group g as the difference of $TN_g$, the target number of concurrent queries currently running for the group g and $N_g$ the currently running queries for the group g. In other words, the number of queries to be submitted for a consumer group g is $\Delta_g$ as determined by the following equation.

$$\Delta_g = (TN_g - N_g).$$

The dispatcher 135 selects $(TN_g - N_g)$ queries for consumer group g and sends 350 the selected queries for execution to the execution engine 250.

Following is an example assuming three active consumer groups. Assume maximum number concurrent queries M is 4. Assume values of $FS_g$ for three consumer groups are 5/9, 3/9, and 1/9 which corresponds to 50%, 30%, and 10% respectively. Assume values for $FT_g$ for the three consumer groups are 5/9, 4/9, and 0. Accordingly, values of $R_g$ for the three consumer groups are 1.0, 1.33, and 0. The calculated values for $Q_g$ with speed up factor $\alpha$ i=1 are 1.0*5/9, (1.0+1.0−1.33)*3/9, and (1.0+1.0)*1/9 respectively. These evaluate to 0.555, 0.222, and 0.222, which add up to 0.999 which is close to 1.0 within margin of error of calculations. The corresponding values for $TN_g$ are 2.22, 0.888, and 0.888. Once the system has achieved its steady state, the target allocation values for $TN_g$ will be 2.22, 1.33, and 0.44 which are in the same proportion as 5/9, 3/9, and 1/9, i.e., the values of $FS_g$ for the three consumer groups.

In some situations, the value of $Q_g$ can be negative. In this situation, the system distributes the sum of all negative contributions across all consumer groups to consumer groups that have positive contributions in them. The negative contribution is distributed in the relative weights of positive contributions. Also a value of the number of queries to be submitted to a consumer group, i.e., $\Delta_g$ may turn out to be negative as well. In this situation, the system distributes all negative contributions to consumer groups that have positive values of $\Delta_g$.

Alternative Applications

Embodiments of the invention can be used to schedule requests received by an online system. The online system may receive requests from a user or from an application. The online system maintains a set of consumer groups, each consumer group associated with one or more sources of requests. The online system receives a measure of amount of resource allocated for each consumer group. The online system maintains a measure of accumulated elapsed time of execution of requests received from each consumer group. The online system determines whether resources are available for processing a request. If the system 100 determines that resources are available for executing the request, the online system selects a rest for execution from a consumer group based on the measure of accumulated elapsed time for processing requests for the consumer group and the measure of amount of resources allocated for the consumer group.

In an embodiment, the online system selects the request based on a comparison of the measure of accumulated elapsed time for processing requests for the consumer group and the measure of amount of resources allocated for the consumer group. In another embodiment, the online system selects the request based on a ratio of the measure of accumulated elapsed time for processing requests for the consumer group and the measure of amount of resources allocated for the consumer group.

In an embodiment, the online system reduces the rate at which requests from a particular consumer group are processed if the measure of accumulated elapsed time for processing requests exceeds the measure of amount of resources allocated for that particular consumer group. In another embodiment, the system increases the rate at which queries from a particular consumer group are processed if the measure of accumulated elapsed time for processing queries is below the measure of amount of resources allocated for that particular consumer group.

The online system may classify the requests based on a consumer group classification to determine the consumer group of each request based on a set of classification rules mapping request attributes to consumer groups. A classification rule may map a request to a consumer group based on one or more of: database user name, client user name, application name, client IP address, authentication type (LDAP, Kerberos etc.), request group, request type, or a user defined keyword. The online system may classify the requests based on a service class specifying the runtime attributes of resources used for executing each request. In an embodiment, the online system maintains the current rate at which requests from a particular consumer group are processed if the measure of accumulated elapsed time for processing requests is within a threshold value of the measure of amount of resources allocated for a particular consumer group.

In an embodiment, the online system determines a measure of difference between accumulated elapsed time for processing queries and the measure of amount of resources allocated for a particular consumer group. The online system further determines an amount by which the rate at which queries from that particular consumer group are processed is changed. The online system may change the amount by which the rate at which queries from that particular consumer group are processed based on a configurable speedup factor. The online system increases a value of the speedup factor for achieving faster convergence of the amount of resources used by consumer groups towards a ratio of the amount of resources allocated to each consumer group. Alternatively, the online system decreases a value of the speedup factor for achieving slower convergence of the amount of resources used by consumer groups towards a ratio of the amount of resources allocated to each consumer group.

Several embodiments are described herein using a parallel architecture. However, other embodiments based on a single processor architecture are foreseeable. Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method for scheduling queries for execution in a database system, the method comprising:

maintaining a set of consumer groups, each consumer group corresponding to one or more users or applications;

receiving a measure of amount of resources allocated for each consumer group;

maintaining a measure of accumulated elapsed time of execution of database queries for each consumer group, the measure of accumulated elapsed time determined as an aggregate value based on the elapsed time of database queries for a consumer group;

receiving database queries to be processed, each of the database queries to be processed being classified into a corresponding consumer group;

determining a measure of current resource usage for each consumer group based on the measure of amount of resources allocated for the consumer group and the measure of accumulated elapsed time of execution of database queries for the consumer group; and scheduling the database queries to be processed by the resources, comprising: for each consumer group:

determining a fractional number of database queries to be allocated to the consumer group based on the measure of current resource usage for the consumer group and the measure of amount of resources allocated to the consumer group, selecting from the database queries a number of database queries corresponding to the consumer group for execution by the resources concurrently with database queries corresponding to other consumer groups based at least on the fractional number of queries determined for the consumer group, and reserving execution time slots of the resources for processing the database queries classified into the consumer group according to the selected number of database queries corresponding to the consumer group.

2. The computer-implemented method of claim 1, wherein selecting the number of database queries is based on a comparison of the measure of accumulated elapsed time for processing database queries for the consumer group and the measure of amount of resources allocated for the consumer group.

3. The computer-implemented method of claim 1, wherein selecting the number of database queries is based on a ratio of the measure of accumulated elapsed time for processing database queries for the consumer group and the measure of amount of resources allocated for the consumer group.

4. The computer-implemented method of claim 1, wherein selecting a database query for execution comprises:

reducing a rate at which queries from a particular consumer group are processed if the measure of accumulated elapsed time for processing queries exceeds the measure of amount of resources allocated for that particular consumer group.

5. The computer-implemented method of claim 1, wherein selecting a database query for execution comprises:

increasing a rate at which queries from a particular consumer group are processed if the measure of accumulated elapsed time for processing queries is below the measure of amount of resources allocated for that particular consumer group.

6. The computer-implemented method of claim 1, wherein selecting a database query for execution comprises:

maintaining a rate at which queries from a particular consumer group are processed if the measure of accumulated elapsed time for processing queries is within a threshold value of the measure of amount of resources allocated for a particular consumer group.

7. The computer-implemented method of claim 1, further comprising:

determining a measure of difference between accumulated elapsed time for processing queries and the measure of amount of resources allocated for a particular consumer group; and determining an amount by which a rate at which queries from that particular consumer group are processed is changed.

8. The computer-implemented method of claim 7, wherein the amount by which the rate at which queries from that particular consumer group are processed is changed further depends on a configurable speedup factor.

9. The computer-implemented method of claim 8, further comprising:

increasing a value of the speedup factor for achieving faster convergence of an actual amount of resources used by consumer groups towards a ratio of the amount of resources allocated to each consumer group.

10. The computer-implemented method of claim 8, further comprising:

decreasing a value of the speedup factor for achieving slower convergence of an actual amount of resources used by consumer groups towards a ratio of the amount of resources allocated to each consumer group.

11. The computer-implemented method of claim 1, further comprising:

classifying the database queries to be processed based on a consumer group classification into the corresponding consumer groups, the consumer group classification specifying a set of classification rules mapping query attributes to consumer groups.

12. The computer-implemented method of claim 11, wherein the query attributes comprise:

a database user name, a client user name, an application name, a client IP address, an authentication type, or a database query type.

13. The computer-implemented method of claim 1, further comprising:

classifying the database queries to be processed based on a service class specifying runtime attributes of resources used for executing each database query.

14. The computer-implemented method of claim 1, wherein a source of database queries is one of a user or an application.

15. The computer-implemented method of claim 1, further comprising:

maintaining indications of which consumer groups are actively using resources of the database system;

wherein an active consumer group is associated with a measure of share of resources for all active consumer groups; and wherein selecting the database queries for execution is further based on the share of resources of the consumer group.

16. The computer-implemented method of claim 15, further comprising:

marking the active consumer group inactive responsive to not receiving database queries from the active consumer group for more than a threshold time.

17. The computer-implemented method of claim 15, further comprising:

marking an inactive consumer group as active responsive to receiving a database query for processing from the inactive consumer group.

18. The computer-implemented method of claim 1, wherein the accumulated elapsed time is measured for queries processed within a moving time window.

19. A computer readable non-transitory storage medium storing instructions thereon, the instructions when executed by a processor cause the processor to:

maintain a set of consumer groups, each consumer group corresponding to one or more users or applications;

receive a measure of amount of resource allocated for each consumer group;

maintain a measure of accumulated elapsed time of execution of database queries for each consumer group, the measure of accumulated elapsed time determined as an aggregate value based on the elapsed time of database queries for a consumer group;

receive database queries to be processed, each of the database queries to be processed being classified into a corresponding consumer group;

determining a measure of current resource usage for each consumer group based on the measure of amount of resources allocated for the consumer group and the measure of accumulated elapsed time of execution of database queries for the consumer group; and schedule the database queries to be processed by the resources, comprising: for each consumer group:
   determining a fractional number of queries to be allocated to each consumer group based on the measures of current resource usage for the consumer groups and the measures of amount of resources allocated to the consumer groups,
   selecting from the database queries a number of database queries corresponding to the consumer group for execution by the resources concurrently with database queries corresponding to other consumer groups based at least on the fractional number of queries determined for the consumer group, and
   reserving execution time slots of the resources for processing the database queries classified into the consumer group according to the selected number of database queries corresponding to the consumer group.

20. A computer-implemented system for scheduling queries for execution in a database system, the computer-implemented system comprising:

a computer processor; and a computer-readable storage medium storing instructions thereon, the instructions when executed by the computer processor cause the computer processor to:

maintain a set of consumer groups, each consumer group corresponding to one or more users or applications;

receive a measure of amount of resource allocated for each consumer group;

maintain a measure of accumulated elapsed time of execution of database queries for each consumer group, the measure of accumulated elapsed time determined as an aggregate value based on the elapsed time of database queries for a consumer group;

receive database queries to be processed, each of the database queries to be processed being classified into a corresponding consumer group;

determining a measure of current resource usage for each consumer group based on the measure of amount of resources allocated for the consumer group and the measure of accumulated elapsed time of execution of database queries for the consumer group; and schedule the database queries to be processed by the resources, comprising: for each consumer group:
   determining a fractional number of queries to be allocated to each consumer group based on the measures of current resource usage for the consumer groups and the measures of amount of resources allocated to the consumer groups,
   selecting from the database queries a number of database queries corresponding to the consumer group for execution by the resources concurrently with database queries corresponding to other consumer groups based at least on the fractional number of queries determined for the consumer group, and
   reserving execution time slots of the resources for processing the database queries classified into the consumer group according to the selected number of database queries corresponding to the consumer group.

\* \* \* \* \*